United States Patent [19]
Reiber

[11] 4,352,154
[45] Sep. 28, 1982

[54] VARYING TWO PHASE VOLTAGES IN DC TO THREE PHASE CONVERTER

[75] Inventor: Hans Reiber, Stuttgart, Fed. Rep. of Germany

[73] Assignee: International Standard Electric Corporation, New York, N.Y.

[21] Appl. No.: 238,335

[22] Filed: Feb. 26, 1981

[30] Foreign Application Priority Data

Feb. 29, 1980 [DE] Fed. Rep. of Germany ....... 3007629

[51] Int. Cl.³ .............................................. H02M 7/44
[52] U.S. Cl. .................................... 363/123; 363/132; 363/137
[58] Field of Search ............... 318/722, 801, 802, 811; 363/41, 42, 96, 135–137, 39, 40, 95, 123, 131, 132

[56] References Cited

U.S. PATENT DOCUMENTS 3,694,718 9/1972 Graf et al. ....................... 363/137 X
4,078,192 3/1978 Fultz ................................. 363/42 X
4,228,491 10/1980 Abraham et al. ..................... 363/41

FOREIGN PATENT DOCUMENTS 515245 6/1976 U.S.S.R. ............................. 363/137

Primary Examiner—A. D. Pellinen
Attorney, Agent, or Firm—John T. O'Halloran

[57] ABSTRACT

If a three-phase current is generated by dc-to-ac conversion, a higher ac output voltage is achieved by connecting each of the three phases alternately to one of the two terminals of the dc voltage source during a sixth-period section, while the two other phases have a sinusoidal waveform, such that the difference voltages between all three phases are sinusoidal.

12 Claims, 4 Drawing Figures

VARYING TWO PHASE VOLTAGES IN DC TO THREE PHASE CONVERTER

BACKGROUND OF THE INVENTION

The present invention relates to a method of generating a three-phase current from a dc voltage by dc-to-ac conversion, and to an arrangement for carrying out this method.

A three-phase current generated in this manner is preferably used in variable-frequency induction motors, whose advantageous behaviour is described, for example, in "AEG-Mitteilungen 55 (1965) 2", pages 118–123.

The generation of variable-frequency alternating voltages with inverters is described, for example, in "AEG-Mitteilungen 54 (1964) ½", pages 89–106. In that publication it is also stated that a virtually sinusoidal current can be achieved in an inductive load, such as an induction motor, by pulse-width modulation of the inverter. To attain this frequently desired sinusoidal current, sinusoidal ac voltages are generated whose sinusoidal difference is effective in the induction motor, and whose maximum amplitude is limited by the voltage of the dc voltage source.

SUMMARY OF THE INVENTION

The object of the invention is to provide a method of generating a three-phase current from a dc voltage by dc-to-ac conversion whereby a higher effective ac voltage can be obtained between the ac voltage outputs than is possible by the method referred to above, and an arrangement for performing the method of the invention.

This is achieved in that the method of the invention includes each one-sixth of the period the steps of maintaining a respective one of the three phases at a respective one of the voltages, and varying the voltages of the respective remaining two phases in substantially sinusoidal waveforms with a shift of 60 electrical degrees therebetween.

Further features of the method of the invention and of the arrangement for performing such method will become apparent from the remainder of the disclosure.

An advantage of the invention is that three-phase motors designed for a given rated voltage to be applied to their three terminals are supplied with virtually the full rated voltage without additional transformer means.

Another advantage is that during each sixth of a period of the ac voltage to be generated, only two variable waveforms need to be formed. From this it follows that if pulse-width modulation is used, only two pulse-width modulators are needed; if function values are stored in digital form, only two digital-to-analog converters are required.

A further advantage is that if the function values are stored, only values of one sixth of a period of a sine function need to be stored. The application of the method according to the invention thus leads to a considerable decrease in circuit complexity.

BRIEF DESCRIPTION OF THE DRAWING

Embodiments of the invention will now be explained in more detail with reference to the accompanying drawings, in which.

DETAILED DESCRIPTION OF THE PREFERRED EMBODIMENT

Figure 1:
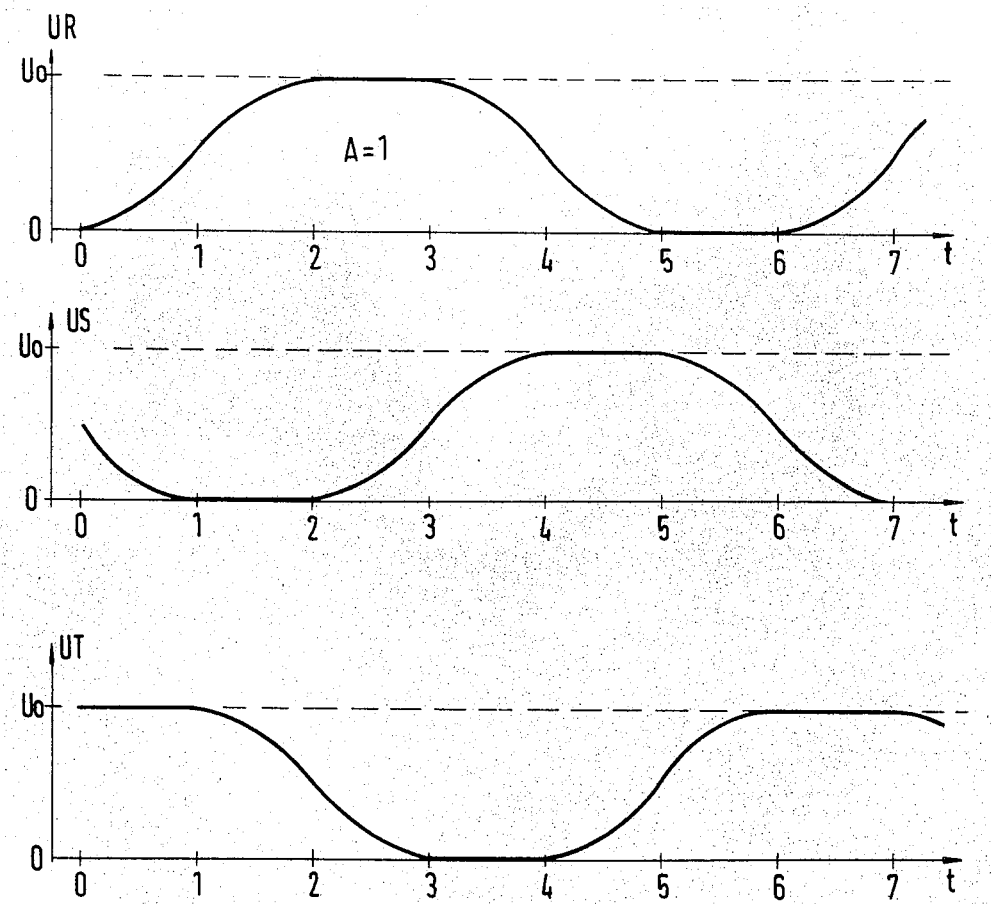
FIG. 1 shows the waveforms of the three ac voltage referred to the potentials of the dc voltage source and generated in accordance with the invention.

FIG. 1 shows the waveforms of three ac voltages generated in accordance with the invention, which are designated UR, US, UT in accordance with the designations R, S, T commonly used in three-phase networks, and differ in phase from each other by one third of a period. The abscissae are divided into sixth-period sections so that one period is marked from 0 to 6. The maximum value of each of the ac voltages is the voltage Uo, which is equal to the dc voltage to be converted to an ac voltage, and the minimum value is zero and equal to the negative potential 0 of the dc voltage source. Shown by the example of UT, the ac voltages follow the following functions in the period sections indicated on the abscissa:

Section 0–1: UT = Uo
1–2: UT = Uo × A × sin [ωt],
with ωt changing from point 1 to point 2 from 90 to 150 degrees;
2–3: UT = Uo × (1 − A × sin [ωt])
for ωt from 30 to 90 degrees;
3–4: UT = O
4–5: UT = Uo × (1 − A × sin [ωt])
for ωt from 90 to 150 degrees;
5–6: UT = Uo × A × sin [ωt])
for ωt from 30 to 90 degrees;
6–7: corresponds to section 0–1, i.e., the waveform begins to repeat itself.

The ac voltage waveforms of UR and US differ from that of UT only in that they are shifted in time by two sixth-period sections. It can also be seen that in each sixth-period section, the sinusuidal slopes of those two portions of the waveform which do not have the amplitude Uo or 0 differ in phase from each other by 60 degrees.

This fact also permits an auxiliary representation which makes it easier to understand the invention: If the three ac voltages are represented in a vector triangle as is commonly used for three-phase power networks, one corner of the triangle is held at a potential for one sixth of a period, while the two vectors formed by the sides adjacent to these corners differ in phase from each other by 60 degrees. The difference between two ac voltage waveforms of the kind shown is a sinusoidal voltage waveform, as can be proved with the aid of know trigonometric transformations.

Figure 2:
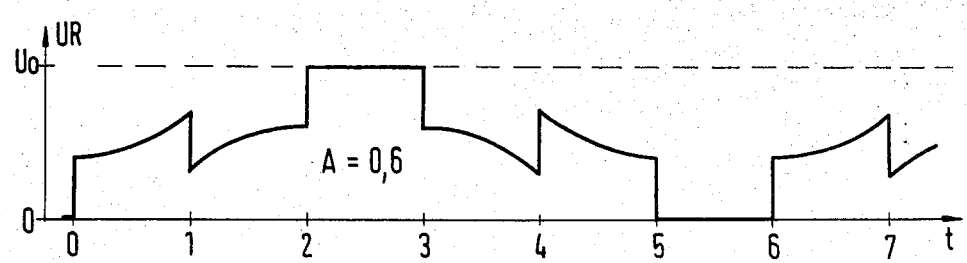
FIG. 2 shows the waveform of the ac voltage corresponding to the voltage UR of FIG. 1 for a smaller effective value.

If the amplitude of the difference voltages is to be reduced, this can be done by reducing the dc voltage and using ac voltages with waveforms as shown in FIG. 1. However, this has the disadvantage that the dc voltage must be changed. This disadvantage is avoided by a curve as shown in FIG. 2, which refers to the voltage UR by way of example. It follows the waveforms shown in FIG. 1 but has a smaller effective value. To obtain this waveform, only those sixth-period sections need to be changed in amplitude which already have a varying function value within the period section. If all three ac voltages UR, US, UT are generated according to FIG. 2, correspondingly smaller effective sinusoidal difference voltages are again obtained.

Figure 3:
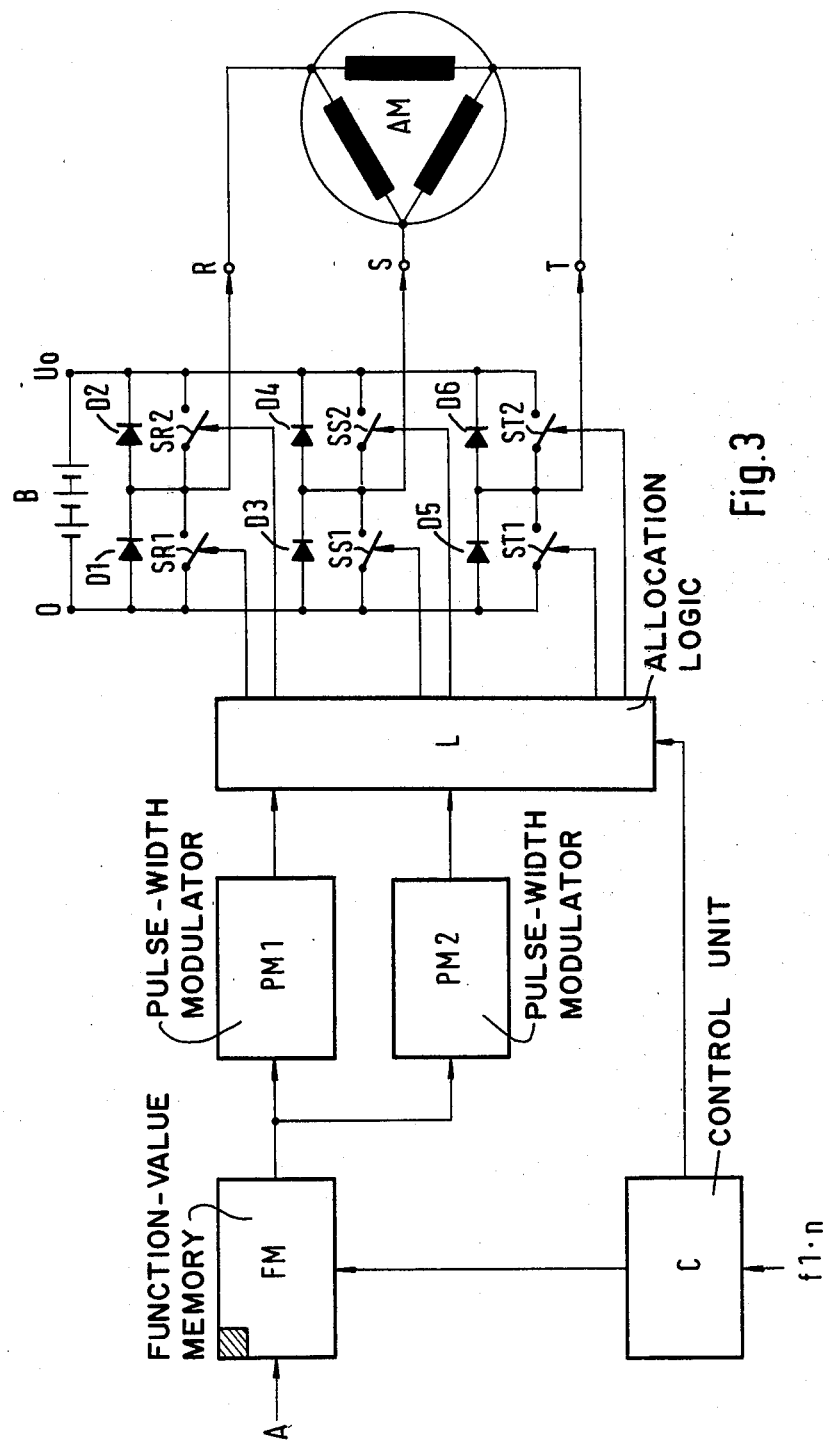
FIG. 3 is a schematic circuit diagram showing the essential parts of an inverter for carrying out the method according to the invention.

FIG. 3 shows an embodiment of an inverter whose controllable elements SR 1, SR 2, SS1, SS2, ST1, and ST2 are switches which are controlled by pulse-width-modulated signals, and each of which is bypassed by one of the diodes D1 to D6. The three ac voltage outputs R, S, T are connected to the terminals O and Uo of the dc voltage source B via one of the switches each. Connected to the ac voltage outputs R, S, T are the delta-connected windings of a three-phase induction motor AM, in which the difference voltages of the ac voltage outputs R, S, T are effective.

The switches SR1 to ST2 are controlled by a control unit C in conjunction with the function values stored in a digital function-value memory FM, which are converted in pulse-width modulators PM1 and PM2 into signals suitable for controlling the switches SR1 to ST2 and are passed through an allocation logic L to the switches.

The pulse-width modulation of the voltages at the ac voltage outputs R, S, T is chosen so that the average values give the voltage waveforms shown in FIG. 1.

As a result of the low-pass action of the motor inductances, a sinusoidal current is then formed in the motor AM which approximately corresponds to the difference voltages of the voltages of FIG. 1. The digital memory FM holds a large number of values of the function sin ($\alpha$) in equidistant argument steps in the range of 30 to 90 degrees. During each sixth of a period of the ac voltage, one function value after the other, beginning with values for 30 degrees and ending with values for 90 degrees, is delivered to the pulse-width modulator PM1; reversely, one function value after the other, beginning with values for 90 degrees and ending with values for 30 degrees, is delivered to the pulse-width modulator PM2 in simultaneous or alternate steps. By suitable allocation of the output signals of the pulse-width modulators PM1 and PM2 to the switches SR1 to ST2, the required voltage waveforms are achieved at the outputs R, S, T. This allocation is performed under the control of the control unit C by the allocation circuit L between the pulse-width modulators and the switches.

Since function values for different effective values A are stored in the memory FM, the function values belonging to the effective value are read out by addressing the memory with a signal A.

The control unit C is fed with a clock signal f1×n, where f1 corresponds to the required frequency of the ac voltages at the outputs R, S, T, and n is the number of function-value steps or a multiple thereof during a period.

Figure 4:
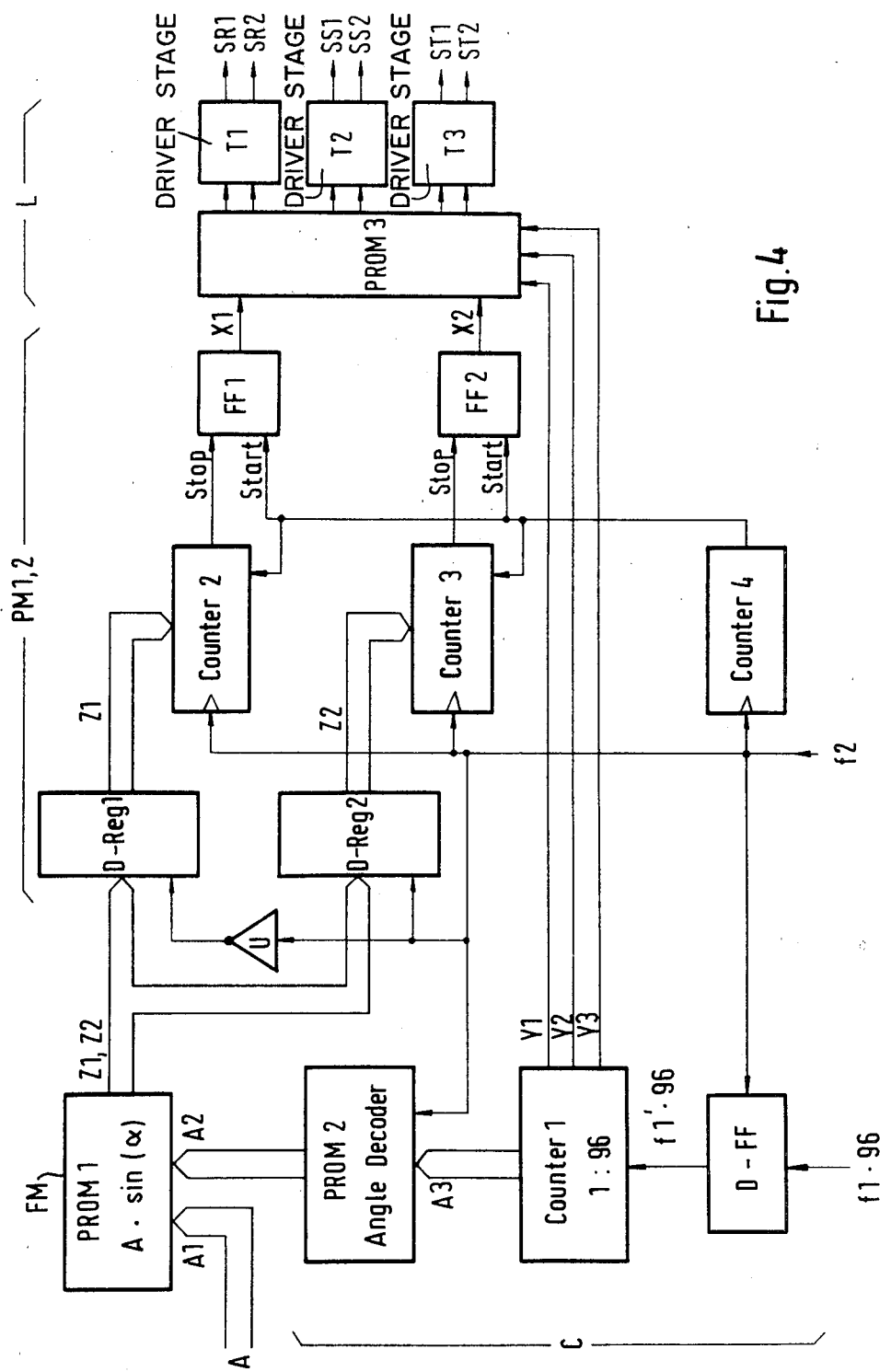
FIG. 4 shows exemplary details of the inverter of FIG. 3.

FIG. 4 shows exemplary details of the embodiment of FIG. 3. The digital memory FM, labeled "PROM1", is fed with two addresses A1 and A2 to cause the function values Z1, Z2 to be read from the memory. The address A1 selects the function values belonging to a given effective value A, and the address A2 selects from these function values the value belonging to a given argument. The address A2 is generated by the control unit C, which is composed of an angle decoder PROM2, a counter 1, a flip-flop D-FF, a counter 4, and a NOT element U. The control unit is fed with the frequency signal f1, corresponding to the ac voltages to be generated, multiplied by 96, and with a system clock f2, having a frequency which is a multiple of f1×96. These two frequency signals f1×96 and f2 are independent and therefore asynchronous, and in the flip-flop D-FF the edges of the frequency signal f1×96 are synchronized with the edges of the system clock, whereby the frequency signal f1'×96 is obtained. This frequency signal f1'×96 is applied to a counter 1, which divides it by 96, so that its count repeats itself periodically with the frequency f1, the count cycle corresponding to 360 degrees, and the counts being delivered as addresses Y1, Y2, Y3 and A3 in the binary code.

Through the factor n=96, the 60-degree sections are specified by the three most significant bits Y1, Y2 and Y3. For addressing the function values within the respective 60-degree section, the least significant bits (bits 4 to 7) obtained with the factor n=96 are applied to the angle decoder PROM2, which assigns two addresses A2 to each address A3 under control of the clock f2, such that for each address A3, the function values Z1=A×sin (30° +$\alpha$) and Z2=A×sin (90° −$\alpha$) are read out of the function-value memory FM under control of f2. The system clock f2 also causes the function values Z1 and Z2 to be transferred in the correct sequence to the intermediate memories D-Reg 1 and D-Reg 2; to this end, it is applied to D-Reg 1 via the NOT element U. The intermediate memory D-Reg 1, a counter 2, and a flip-flop FF 1 form a first pulse-width modulator PM1, and D-Reg 2, a counter 3, and a flip-flop FF2 form a second pulse-width modulator PM2. The counters 2 and 3 are programmed by the applied function values Z1 and Z2, respectively, and count the pulses of the system clock f2. The counter 4 of the control unit divides the system clock f2 by the maximum count of the counters 2 and 3. The output signal of the counter 4 starts the counters 2 and 3 and puts the flip-flops FF1 and FF2 in a first defined condition. After reaching the programmed count, the counters 2 and 3 provide a stop signal which puts the flip-flops FF1 and FF2 in a second condition. The time between the start signal and the stop signal is a measure of the pulse width and can be obtained as pulse signals X1 and X2 from the outputs of the flip-flops FF1 and FF2. These pulse signals X1 and X2 are used to control the switches SR1 to ST2 of the inverter via an allocation logic PROM3 and driver stages T1, T2, T3.

The allocation logic PROM3 and the driver stages T1, T2, T3 form the allocation logic L of FIG. 3. The allocation logic PROM3 is controlled by the addresses Y1 to Y3 formed by the counter 1. This address, referred to the period of f1, changes in 60-degree steps.

I claim:
1. A method of controlling the generation of three-phase alternating current flowing, with a one-third period shift between the phases, between two terminals of a DC source which are at different voltage levels, comprising, during each one-sixth of the period, the steps of:
maintaining a respective one of the three phases at a respective one of the voltage levels; and
varying the voltages of the respective remaining two phases in substantially sinusoidal waveforms with a shift of 60 electrical degrees therebetween,
such that, in the course of the respective period, the voltage of the respective phase remains at the lower level for one-sixth, then sinusoidally rises for the next two-sixths, then remains at the higher level for the next one-sixth, and finally sinusoidally decreases for the next two-sixths of the period.

2. The method as defined in claim 1, wherein said varying step includes so shaping the sinusoidal waveforms as to obtain smooth transitions between the successive one-sixths of the period.

3. The method as defined in claim 1, wherein said varying step includes so shaping the sinusoidal waveforms as to obtain stepped transitions between the successive one-sixths of the period.

4. The method as defined in claim 1, wherein said maintaining step includes connecting the output of the one phase with one of the terminals; and wherein said varying step includes controlledly connecting the outputs of the remaining two phases with the terminals such as to obtain the sinusoidal waveforms.

5. The method as defined in claim 4, wherein said controlledly connecting step includes subdividing the respective one-sixth of the period into a predetermined number of time intervals, and so controlling the connection of the output of the respective phase with the terminals during the respective interval as to obtain an average voltage value corresponding to the value of the sinusoidal waveform for the respective interval.

6. The method as defined in claim 4, wherein said varying step further includes storing the values of the sine function for angles between 30° and 90°; and wherein said controlledly connecting step includes modifying the voltage values of the remaining two phases by the values of the sine function corresponding to the respective points of the sinusoidal waveforms.

7. The method as defined in claim 6, wherein said modifying step includes reading the stored sine function values in increments from 30° to 90° for one, and in increments from 90° to 30° for the other, of the remaining two phases, and allocating the read values of the sine function to the respective ones of the remaining two phases.

8. An arrangement for controlling the generation of three-phase alternating current flowing, with a one-third period shift between the phases, between the terminals of a DC source which are at different voltage levels, comprising:
means for maintaining a respective one of the three phases at a respective one of the voltage levels during a respective one-sixth of the period, and means for varying the voltages of the remaining two phases in substantially sinusoidal waveforms with a shift of 60 electrical degrees therebetween said maintaining and varying means being operative for causing the voltage of the respective phase, in the course of the respective period, to remain at the lower level for one-sixth, to sinusoidally rise for the next two-sixths, to remain at the higher level for the next one-sixth, and to finally decrease for the next two-sixths of the period.

9. The arrangement as defined in claim 8, wherein said maintaining and varying means includes a plurality of controllable elements respectively interposed between the terminals and the outputs of the three phases, and means for so controlling the operation of the controllable elements that the output of the one phase is connected to one of the terminals and the outputs of the remaining two phases are so connected to the terminals as to obtain the sinusoidal waveforms for the remaining two phases during the aforementioned one-sixth of the period.

10. The arrangement as defined in claim 9, wherein said controlling means includes means for subdividing the respective one-sixth of the period into a predetermined number of time intervals, and means for so establishing and interrupting connections of the outputs of the remaining two phases with the terminals during the respective interval as to obtain an average voltage value corresponding to the value of the sinusoidal waveform of the respective phase for the respective interval.

11. The arrangement as defined in claim 9, wherein said varying means further includes means for storing the values of the sine function for angles between 30° and 90°; and wherein said controlling means includes means for so modifying the operation of the controllable elements as to obtain for the remaining two phases respective voltage values modified by the values of the sine function corresponding to the respective points of the sinusoidal waveforms.

12. The arrangement as defined in claim 11, wherein said modifying means includes means for reading the stored sine function values in increments from 30° to 90° for one, and in increments from 90° to 30° for the other, of the remaining two phases, and means for allocating the read values of the sine function to the respective controllable elements associated with the respective ones of the remaining two phases.

* * * * *